(12) United States Patent
Moore

(10) Patent No.: US 8,368,722 B1
(45) Date of Patent: Feb. 5, 2013

(54) CARTOGRAPHIC DISPLAY OF CONTENT THROUGH DYNAMIC, INTERACTIVE USER INTERFACE ELEMENTS

(75) Inventor: Rebecca Moore, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 904 days.

(21) Appl. No.: 11/737,102

(22) Filed: Apr. 18, 2007

Related U.S. Application Data

(60) Provisional application No. 60/793,342, filed on Apr. 18, 2006.

(51) Int. Cl.
*G09G 5/00* (2006.01)
*G06T 11/20* (2006.01)
*G08G 1/123* (2006.01)

(52) U.S. Cl. ........ 345/646; 345/629; 345/440; 345/441; 340/995.1; 340/995.14; 340/995.15

(58) Field of Classification Search .................. None
See application file for complete search history.

(56) References Cited

U.S. PATENT DOCUMENTS

2006/0241860 A1* 10/2006 Kimchi et al. ................ 701/208

OTHER PUBLICATIONS

Luke Wroblewski, "Ajax Interface Design", May 14, 2005, LukeW Ideation + Design, http://www.lukew.com/ff/entry.asp?180.*
"Google Earth KML 2.1" [online]. 2006, [retrieved on Oct. 27, 2011]. Retrieved from the Internet: <URL: http://static.googleusercontent.com/external_content/untrusted_dlcp/earth.google.com/en/us/kml/kml_tags_21.pdf>.

* cited by examiner

*Primary Examiner* — Tize Ma
(74) *Attorney, Agent, or Firm* — Fish & Richardson P.C.

(57) ABSTRACT

An interactive user interface element makes content (e.g., images, news, standard indexed Web content) available to a user of online map services (e.g., virtual globe program). In some implementations, when zoomed out on a feature displayed in map imagery (e.g., virtual globe imagery), the user sees a non-interactive user interface element (e.g., a feature label). As the user expresses greater interest in the feature by, for example, flying ("zooming") toward the feature, the non-interactive user interface element is replaced by (or morphs into) an interactive user interface element (e.g., a feature label including a clickable icon). In some implementations, a user's interaction with the interactive user interface element (or navigation actions in the imagery) launches a content access portal (e.g., a balloon) for presenting content (e.g., text, digital photos, video, audio) and/or providing access (e.g., links) to related content.

23 Claims, 15 Drawing Sheets

CARTOGRAPHIC DISPLAY OF CONTENT THROUGH DYNAMIC, INTERACTIVE USER INTERFACE ELEMENTS

RELATED APPLICATION

This application claims the benefit of priority of U.S. Provisional Patent Application No. 60/793,342, for "Mapping System With Labels Having Dynamic Levels of Interactivity," filed Apr. 18, 2006, which provisional patent application is incorporated by reference herein in its entirety.

TECHNICAL FIELD

The subject matter of this application is generally related to map services.

BACKGROUND

A virtual globe is a 3D software model or representation of the Earth or another world. A virtual globe provides the user with the ability to freely move around in a virtual globe by changing a viewing angle and position. One popular program that allows users to navigate a virtual globe is "The Google Earth" client developed by Google, Inc. (Mountain View, Calif.).

The Google Earth client offers a user a high-performance, virtual fly-through experience of a virtual globe's imagery and terrain. Google Earth annotates this imagery and terrain with feature labels denoting cities, islands, mountains etc. As the user "flies around" in Google Earth, labels appear at different levels of scale, depending upon the significance of the geographic feature. For example, a label for the capital city, Paris, will appear at a larger scale ("zoomed-out") than a small hamlet in upstate New York.

When zoomed-out to a scale where many features are visible, users may desire to see feature labels without icons or other placemarks to minimize visual clutter, providing the user with a familiar "map-like" view. The user, however, may also be interested in learning more about a geographic feature (e.g., an island) marked by a feature label, and would like to have easy and immediate access to content related to the feature (e.g., Web content).

SUMMARY

An interactive user interface element makes content (e.g., images, news, standard indexed Web content) available to a user of an online map service (e.g., virtual globe program). In some implementations, when zoomed out on a feature displayed in map imagery (e.g., virtual globe imagery), the user sees a non-interactive user interface element (e.g., a feature label). As the user expresses greater interest in the feature by, for example, flying ("zooming") toward the feature, the non-interactive user interface element is replaced by (or morphs into) an interactive user interface element (e.g., a feature label including a clickable icon). In some implementations, a trigger event (e.g., reaching or exceeding a predetermined zoom-level) initiates the replacement and/or morphing process. The trigger event can be based on the type of feature (e.g., a land mass, island, city, lake, mountain) and/or significance of the feature (e.g., major city, small town). In some implementations, a user's interaction with the interactive user interface element, or a user action (e.g., a user navigation action), launches a content access portal (e.g., a balloon) for presenting content (e.g., text, digital photos, video, audio) and/or providing access (e.g., links) to related content.

In some implementations, a method includes generating a non-interactive user interface element associated with a map feature for presentation with map imagery; presenting the non-interactive user interface element with map imagery; detecting a user action associated with the map feature; presenting an interactive user interface element in response to the detection; detecting user interaction with the interactive user interface element; and providing access to related content in response to the detection.

In some implementations, a method includes: generating a non-interactive feature label associated with a map feature for presentation with virtual globe imagery; presenting the non-interactive feature label on the virtual globe imagery; detecting a zoom level; presenting an interactive feature label in response to the detected zoom level; identifying input requesting access to content related to the map feature; and providing access to content in response to the input.

In some implementations, a method includes: presenting a non-interactive user interface element in imagery; detecting a user navigating the imagery; presenting a content access portal based on the detected navigation; identifying input received through the content access portal; and providing access to related content based on the input.

Other implementations of cartographic display of indexed web content are disclosed, including implementations directed to systems, methods, apparatuses, computer-readable mediums and user interfaces.

DETAILED DESCRIPTION

System Overview

The text and figures that follow describe a cartographic display of content through dynamic, interactive user interface elements. The content is related to imagery displayed in a user interface provided by an online map service running on a host device (e.g., a personal computer, a mobile phone, a media player/recorder, a personal digital assistant (PDA), an email device, a television, a set-top box, a navigation system).

An example of an online map service is a virtual globe program, such as Google Earth™, developed by Google, Inc. (Mt. View, Calif.). The virtual globe program can be coupled to a server that provides virtual globe imagery, terrain and vector data for annotating the map imagery. The user is provided with one or more navigation controls for navigating the map imagery, including controls for changing the viewer's perspective of the map imagery and for zooming in and out of the map imagery.

In some implementations, an interactive user interface element (e.g., "zoom-to-click" feature label) can be implemented using Extensible Mark Up Language (XML) grammar. In Google Earth™, for example, Keyhole Markup Language (KML) can be used to specify placemarks (e.g., clickable icons), balloons and other interactive user interface elements, and to dynamically fetch and update KML files from a KML server. KML is an XML grammar and file format for modeling and storing geographic features such as points, lines, images and polygons for display in the Google Earth™ 3D viewer. In some implementations, a placemark or other interactive user interface elements can be specified using a KML file. The Google Earth™ client can render the KML file and display the placemark or other interactive user interface elements over the current image.

Further detail on using KML to perform custom applications can be found in the "KML 2.1 reference" document, which is incorporated by reference herein in its entirety. The "KML 2.1 reference" document is publicly available from Google, Inc., and includes samples of KML that can be used to implement custom applications, such as the "zoom-to-click" feature described below.

Examples of Zoom-to-Click Feature

Figure 1:
FIG. 1 is a screenshot of a user interface generated by a virtual globe program for navigating virtual globe imagery.

FIG. 1 is a screenshot of a user interface 100 generated by a virtual globe program for navigating virtual globe imagery 102. In the example shown, the map imagery 102 includes Lizard Island 104, which is displayed at a first zoom level (e.g., eye altitude of 61.39 miles). At the first zoom level, Lizard Island 104 is marked with a non-interactive feature label 106. The user operates a navigation control (not shown) to zoom from the first zoom level to a second zoom level.

Figure 2:
FIG. 2 is a screenshot of virtual globe imagery of Lizard Island, zoomed in with a zoom-to-click icon displayed.
Figure 3:
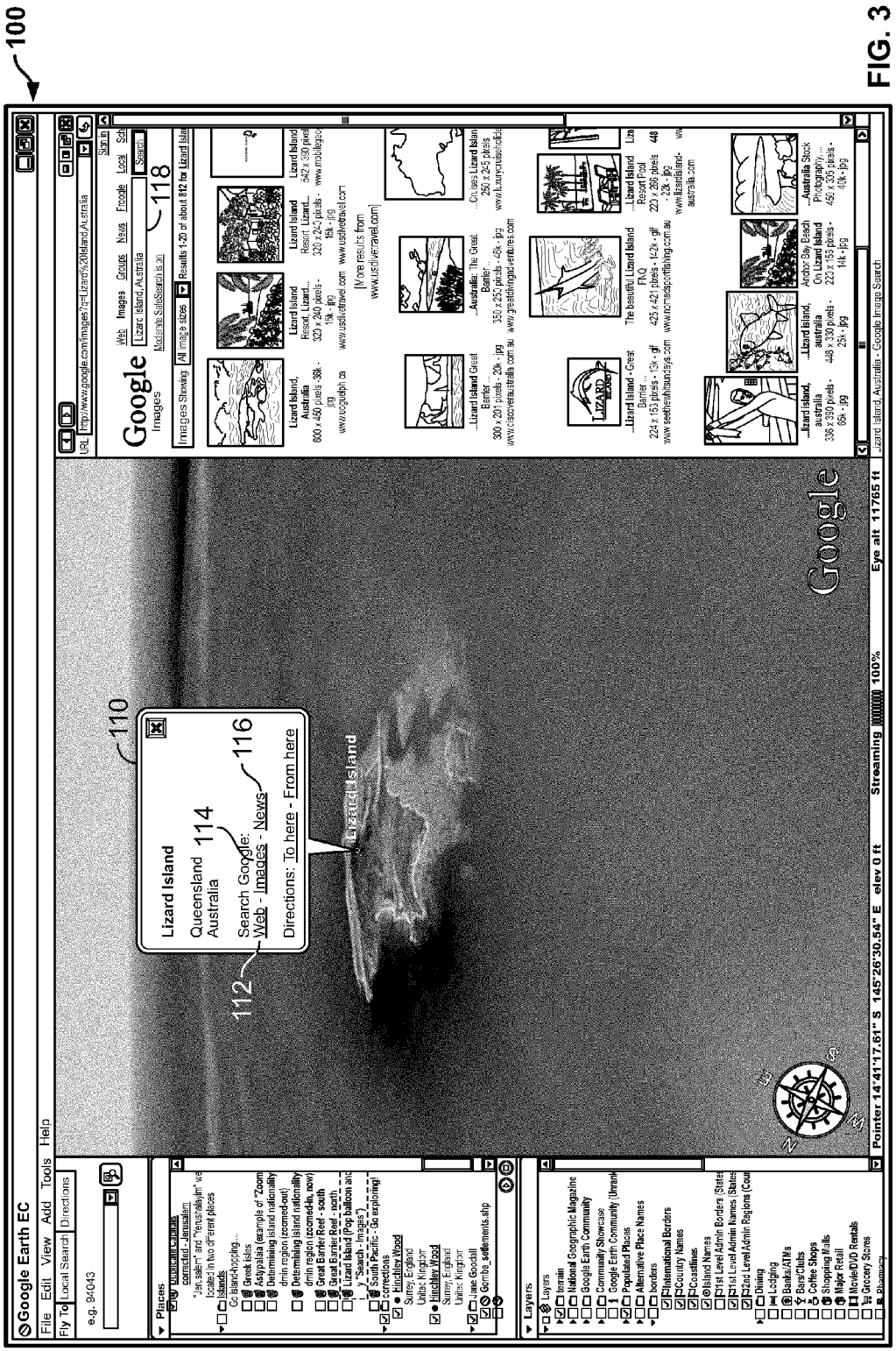
FIG. 3 is a screenshot of virtual globe imagery of Lizard Island, zoomed in closer with a balloon pooped and an image search engine is selected.

FIG. 2 is a screenshot of virtual globe imagery 102, including Lizard Island 104, displayed at the second zoom level (e.g., 32.12 miles). At the second zoom level, the non-interactive feature label 106 is replaced by (or morphs into) an interactive feature label 108 (e.g., a feature label with a clickable icon). If the user clicks, or otherwise interacts, with the interactive feature label 108 (e.g., a mouse over the feature label), a content access portal 110 (e.g., a pop-up balloon or window) is presented in the user interface 100, as shown in FIG. 3. The content access portal 110 provides the user with direct access to content presented in the content access portal 110 (e.g., text) or with indirect access through a link (e.g., URL).

Other types of interactive and/or non-interactive user interface elements can be presented with the map imagery 102, including but not limited to: buttons, windows, panels, panes, combo boxes, combutcons, context menus, check boxes, dialog boxes, drop-down list, file dialog, grid view, icon, label, list box, menu, menu bar, progress bar, radio button, ribbon, scrollbar, slider, spinner, status bar, tab, text box, toolbar, tooltip, tree view, widget, etc.

Referring to FIG. 3, the content access portal 110 (e.g., balloon pop-up window) is presented in the user interface 100 in response to a user's interaction with the interactive feature label 108 (e.g., clicking on the icon). In the example shown, the portal 110 is presented on the map imagery 102 next to the interactive feature label 108. In some implementations, the portal 110 can be displayed anywhere in the user interface 100 (e.g., a side panel) and does not need to be displayed in a window. For example, one or more links can be displayed in a tool bar or panel in the user interface 100 or embedded in the map imagery 102.

In some implementations, the portal 110 can present a variety of content related to the feature of interest (e.g., text, digital photos, video, audio, RSS feeds, broadcasts) and/or links to a variety of related online resources (e.g., search engines, blogs, chat rooms, social networks, Web sites, broadcasts, advertisers, software publishers).

In the example shown, the portal 110 includes text describing the location of Lizard Island (Queensland, Australia), a link 112 for linking to a Web search service, a link 114 for linking to an image search service and a link 116 for linking to a news search service.

In some implementations, a link can be presented that causes a telephone number to be dialed or starts an application (e.g., email, instant messaging). In some implementations, the user is presented with a text box, link, drop zone or other mechanism for creating content (e.g., a text message editor) and/or a mechanism for attaching content (e.g., digital photos, video clips) to the interactive user interface element 108. In some implementations, content can be uploaded to a network storage device for future retrieval by the user or other users (e.g., a social community site).

In the example shown, the user clicks the link 114 to launch the image search service. In response to the click,-a preconfigured search query is launched to the image search service using the string, "Lizard Island, Australia," and the search results are returned (e.g., to the sidebar shown). So it is not necessary for the user to enter any search text, merely to click the link.

Figure 4:
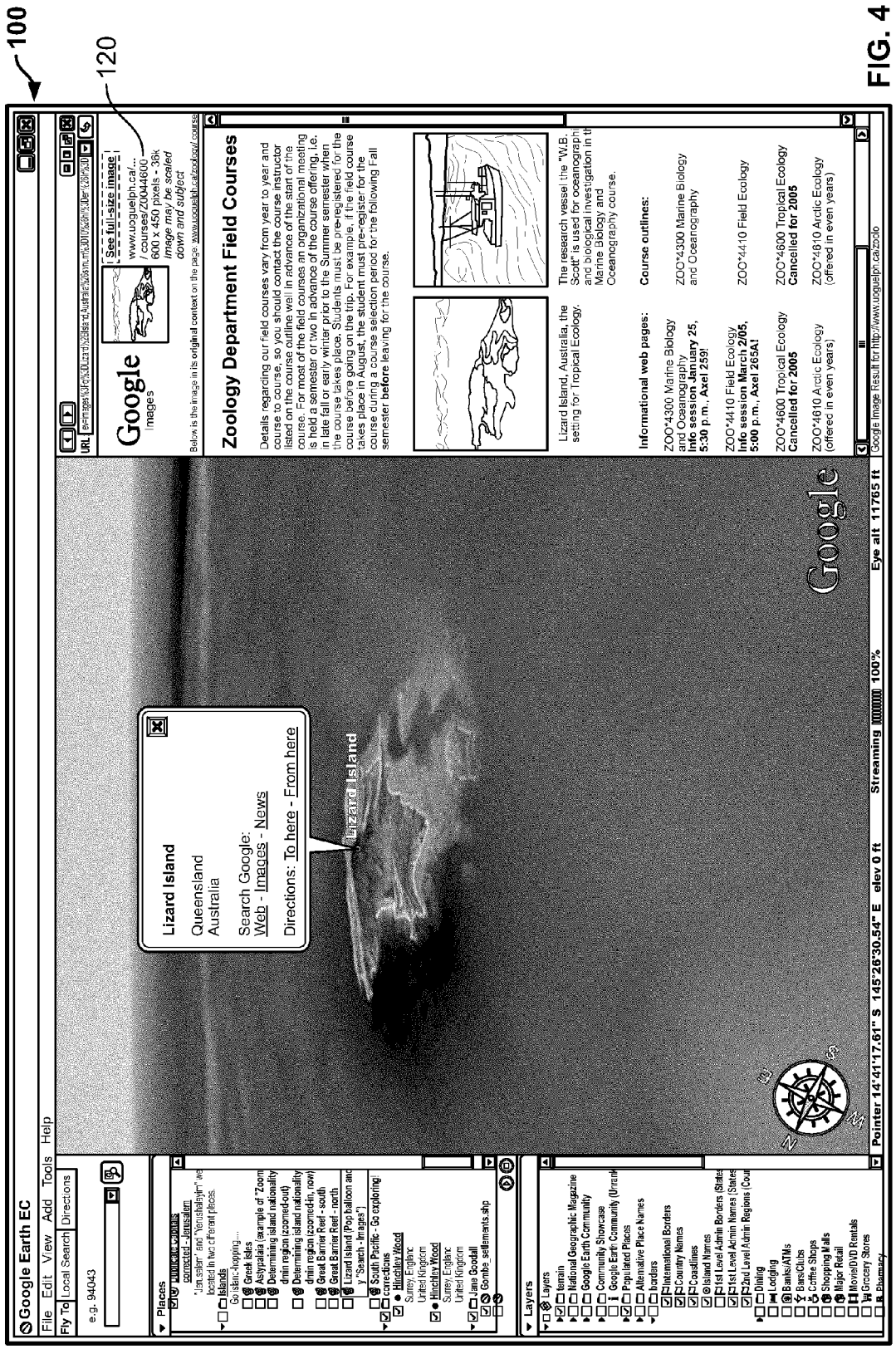
FIG. 4 is a screenshot of virtual globe imagery of Lizard Island, displaying image search engine results including a digital photo of Lizard Island that matches the virtual global imagery.

FIG. 4 is a screenshot of the user interface 100 displaying image search results for the query described above. The results include a digital photo 120 of Lizard Island, which matches the search query and looks similar to the image of Lizard Island 104 in the map imagery 102.

To summarize the "Lizard Island" example described above, a user navigates over Lizard Island at a first zoom level. At the first zoom level, a non-interactive user interface element 106 is presented. When the user zooms to a second zoom level, the non-interactive user interface element 106 is replaced with (or morphs into) an interactive user interface element 108. In some implementations, the zoom level at which the replacement or morph takes place can be controlled based on the type and significance of the feature.

When the user interacts with the use interface element 108 (e.g., clicks an icon, mouse over a feature label), the content access portal 110 (e.g., a pop-up balloon or window) is presented. The portal 110 provides access to content (e.g., text describing Lizard Island) and one or more links 112, 114, 116, to launch Web, image and news search services, respectively. The user clicks on link 114, launching the image search service. In response to the click, a preconfigured search query is launched to the image search service using the string, "Lizard Island, Australia", and the search results are returned (e.g. to the sidebar shown.) So it is not necessary for the user to enter any search text, merely to click the link. The image search service processes the query and returns several thumbnail images of Lizard Island that match the search query. An example of an image search service is Google Image Search™.

An advantage of the "zoom-to-click" feature described above is that it makes the rich content of the Web and/or other online resources available to a user navigating map imagery without the visual clutter caused by presenting too many labels, icons or other placemarks at a particular zoom level or location. In some implementations, the "zoom-to-click" feature allows a virtual globe program to become a "geo-portal" to Web content and other online resources, allowing a user to explore and search spatially, rather than by entering text in a search text box.

The Lizard Island example described included two zoom levels. However, the zoom-to-click feature can be used with any number of zoom levels. The presentation of interactive user interface elements can occur in response to any desired trigger event, such as zooming a feature from one zoom level to another zoom level, rotating imagery over a feature, hovering over a feature, etc.

Figure 5:
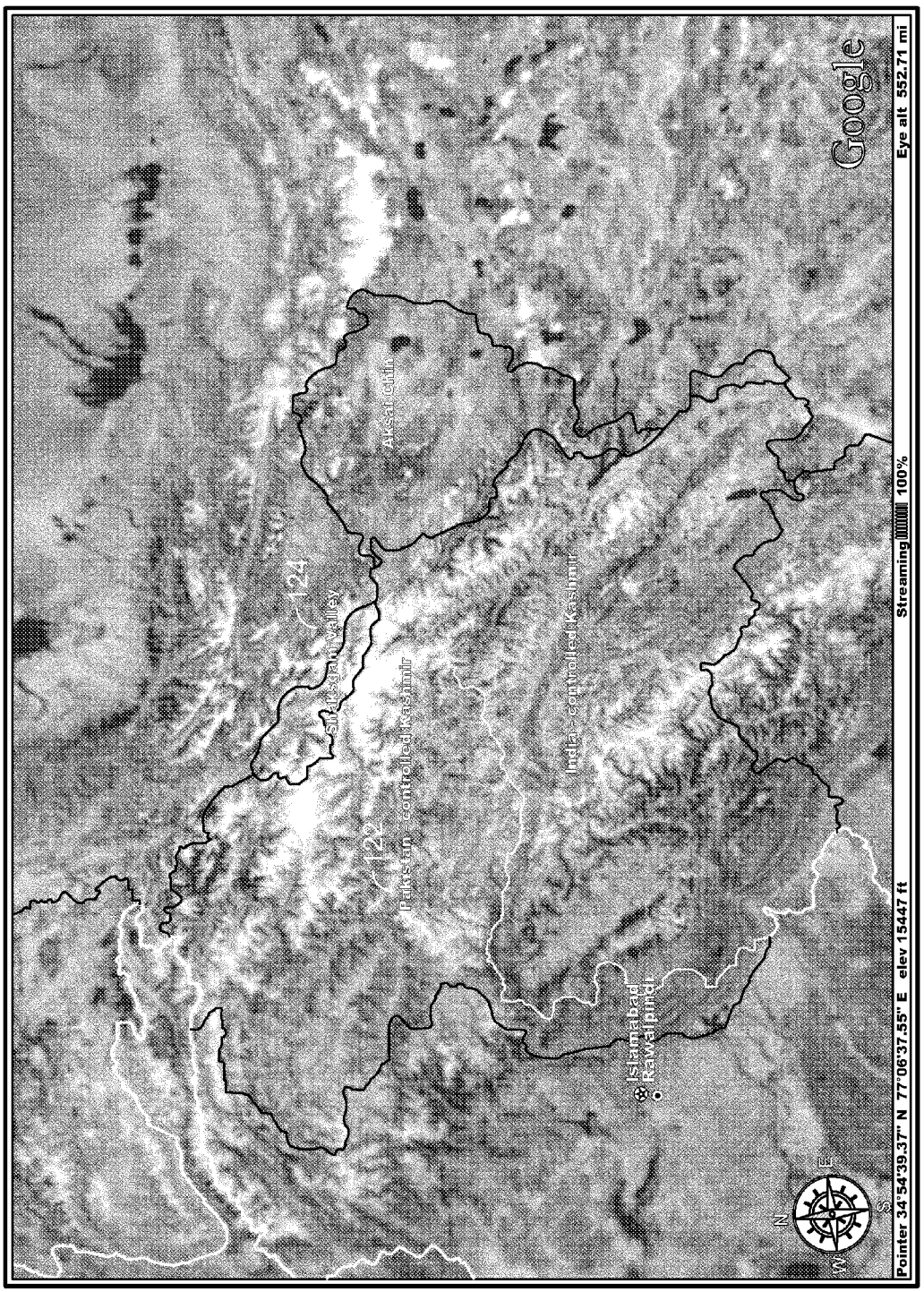
FIG. 5 is a screenshot of virtual globe imagery of Kashmir region, including four labels with political annotation, including Shaksgam Valley.

FIG. 5 is a screenshot of virtual globe imagery of a Kashmir region at a first zoom level (e.g., eye altitude of 552.71 miles). At this first zoom level, several labels are presented in the map imagery 102. Label 122 is a political annotation of a disputed territory and label 124 is a non-interactive feature label marking the Shaksgam Valley. In this example, the user has an interest in Shaksgam Valley and activates a navigation control (not shown) to zoom to a second zoom level (e.g., eye altitude of 81.42 miles) to gain a closer view of Shaksgam Valley.

Figure 6:
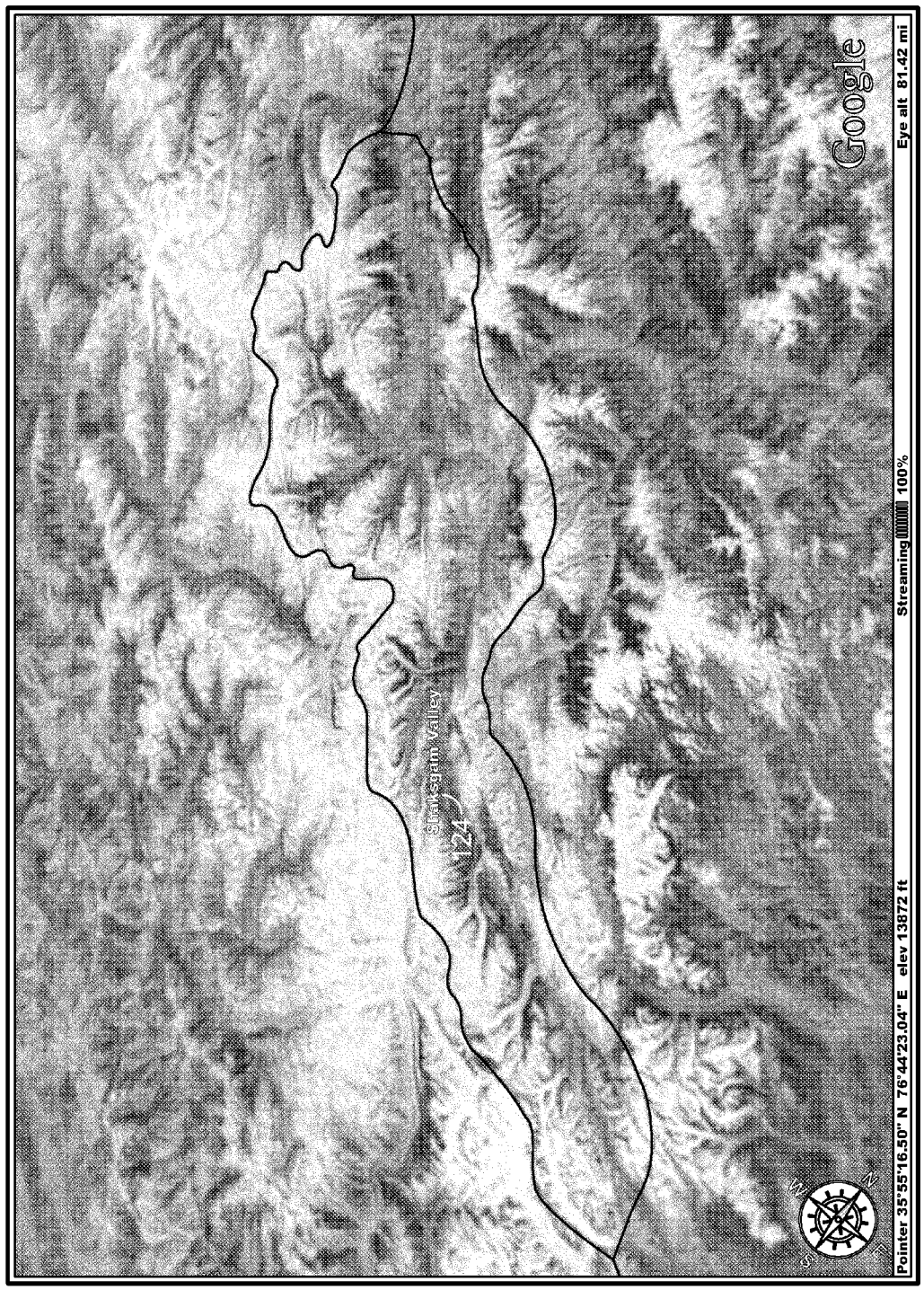
FIG. 6 is a screenshot of virtual globe imagery of Shaksgam Valley zoomed in just prior to a clickable icon appearing.

FIG. 6 is a screenshot of virtual globe imagery of Shaksgam Valley zoomed to a second zoom level just prior to a clickable icon appearing on the label 124, thereby making the label 124 interactive. At the second zoom level, the non-interactive label 124 is still presented in the imagery 102, overlying the Shaksgam Valley. The user then zooms in further to a third zoom level, while focusing on the Shaksgam Valley.

Figure 7:
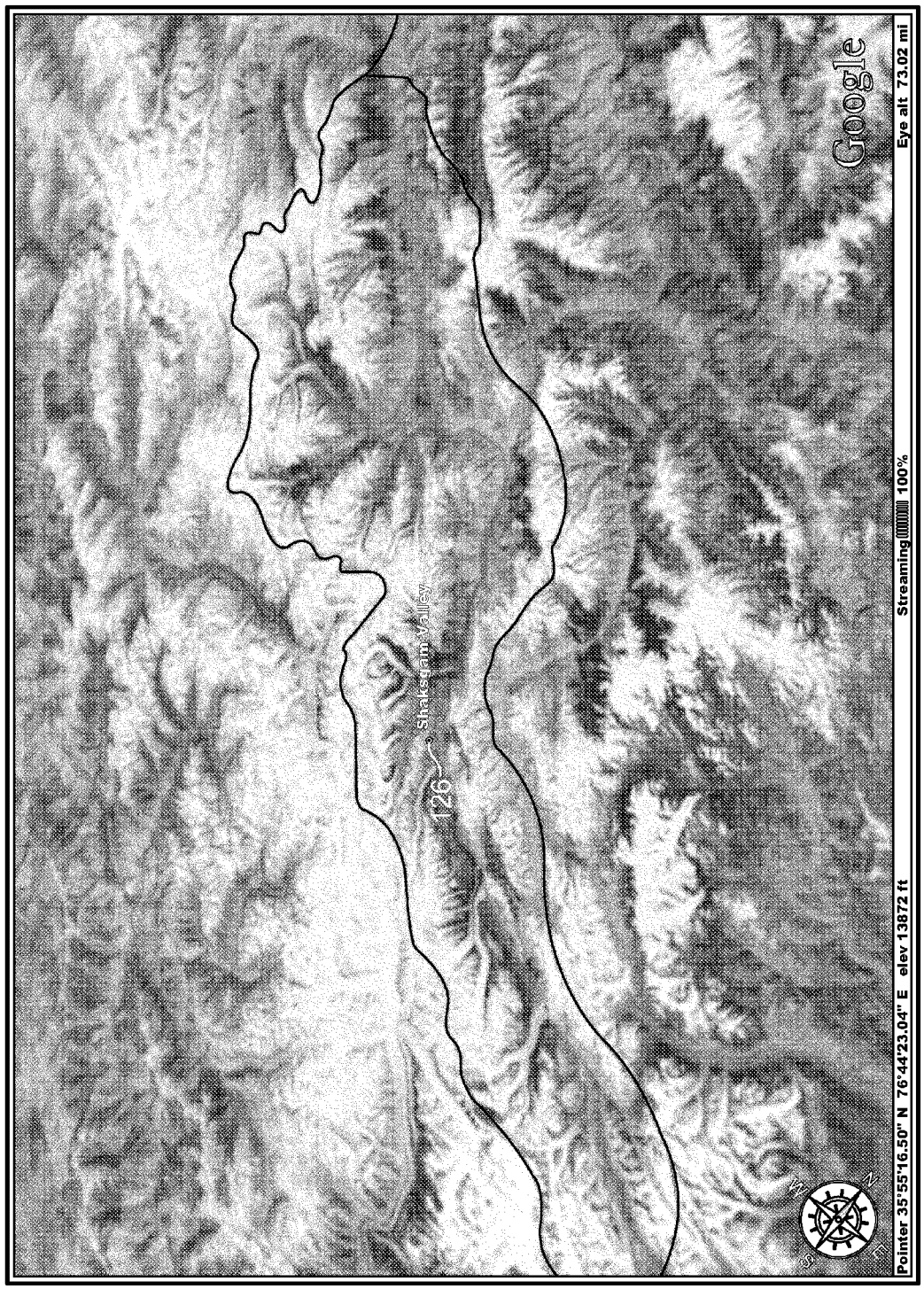
FIG. 7 is a screenshot of virtual globe imagery of Shaksgam Valley, zoomed in closer with a zoom-to-click icon displayed.

FIG. 7 is a screenshot of virtual globe imagery of the Shaksgam Valley at the third zoom level (e.g., eye altitude of 73.02 miles). At this zoom level, an interactive user interface element 126 is displayed (e.g., a clickable icon). In this example, the user clicks on the interactive user interface element 126, resulting in the presentation of a content access portal 128 (e.g., a balloon pop-up window), as shown in FIG. 8.

Figure 8:
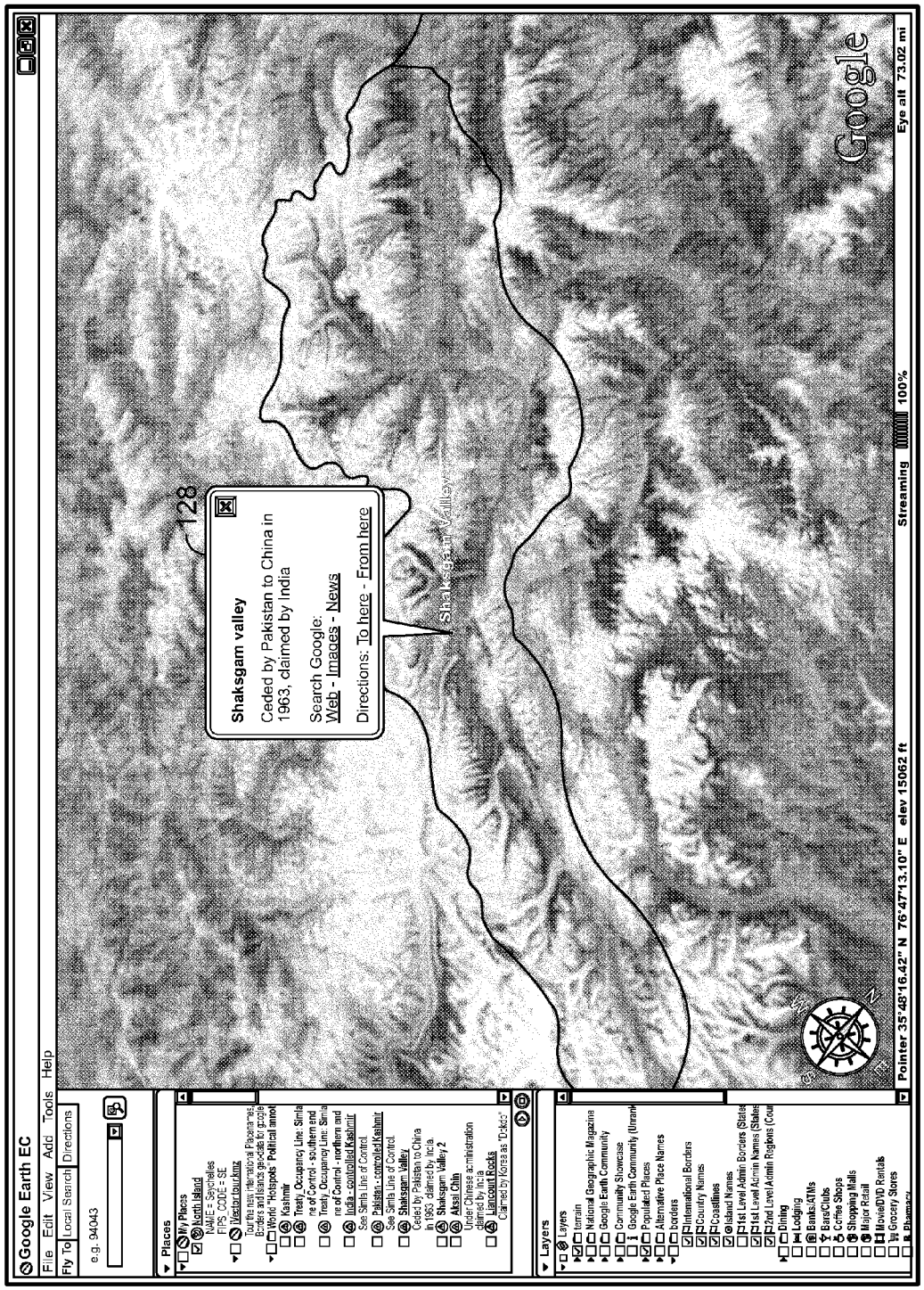
FIG. 8 is a screenshot of virtual globe imagery of Shaksgam Valley with the zoom-to-click icon clicked and a balloon popped.
Figure 9:
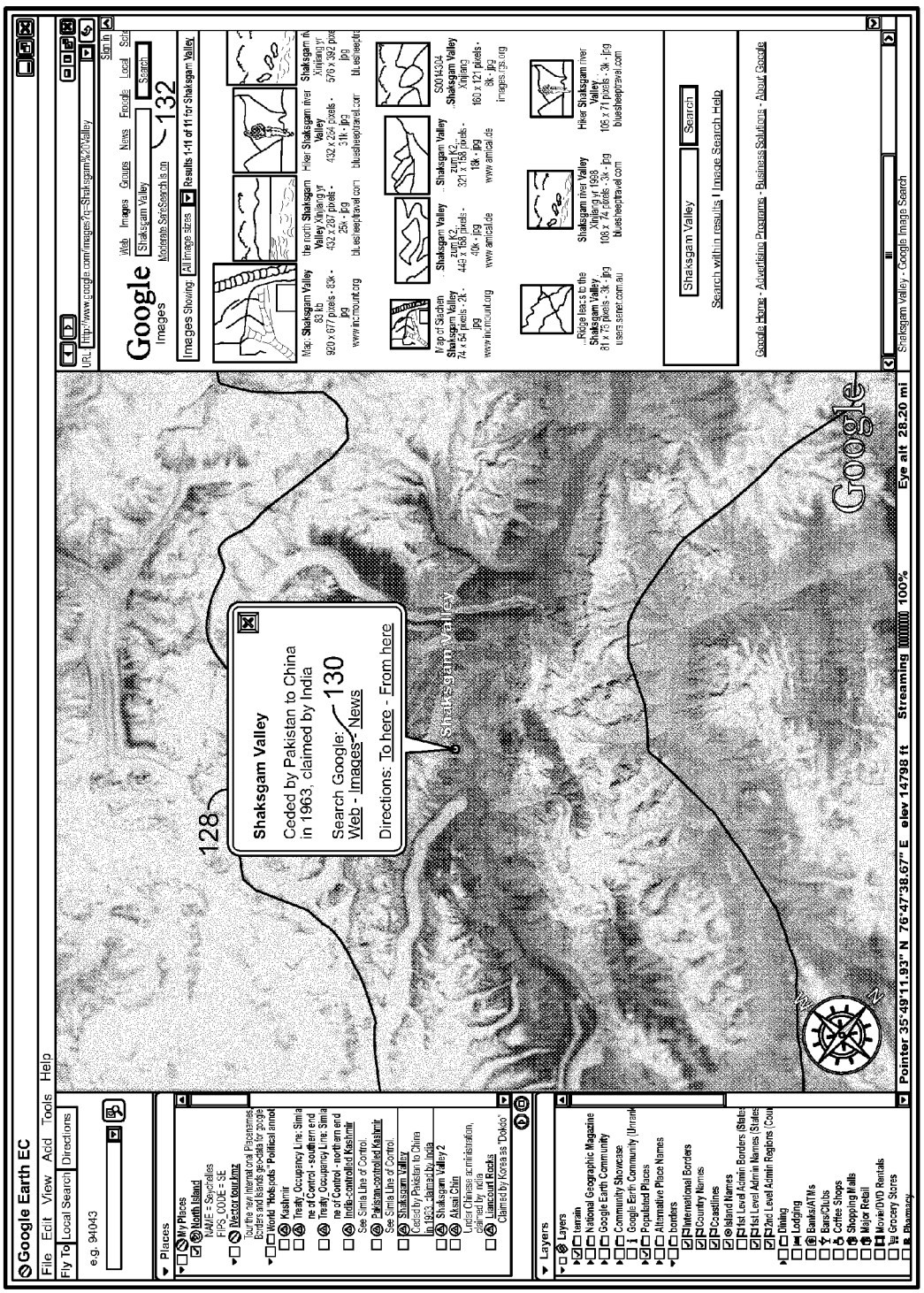
FIG. 9 is a screenshot of virtual globe imagery of Shaksgam Valley, with an image search engine selected.

FIG. 8 is a screenshot of virtual globe imagery of Shaksgam Valley with the interactive user interface element 126 clicked and the content access portal 128 displayed. The content access portal 128 includes several links, including a link 130 to an image search service. The user clicks the link 130 to launch the image search service. In some implementations, when the user clicks the link 130 a preset search query is presented for the feature (e.g., behind anchor text in a balloon).

Figure 10:
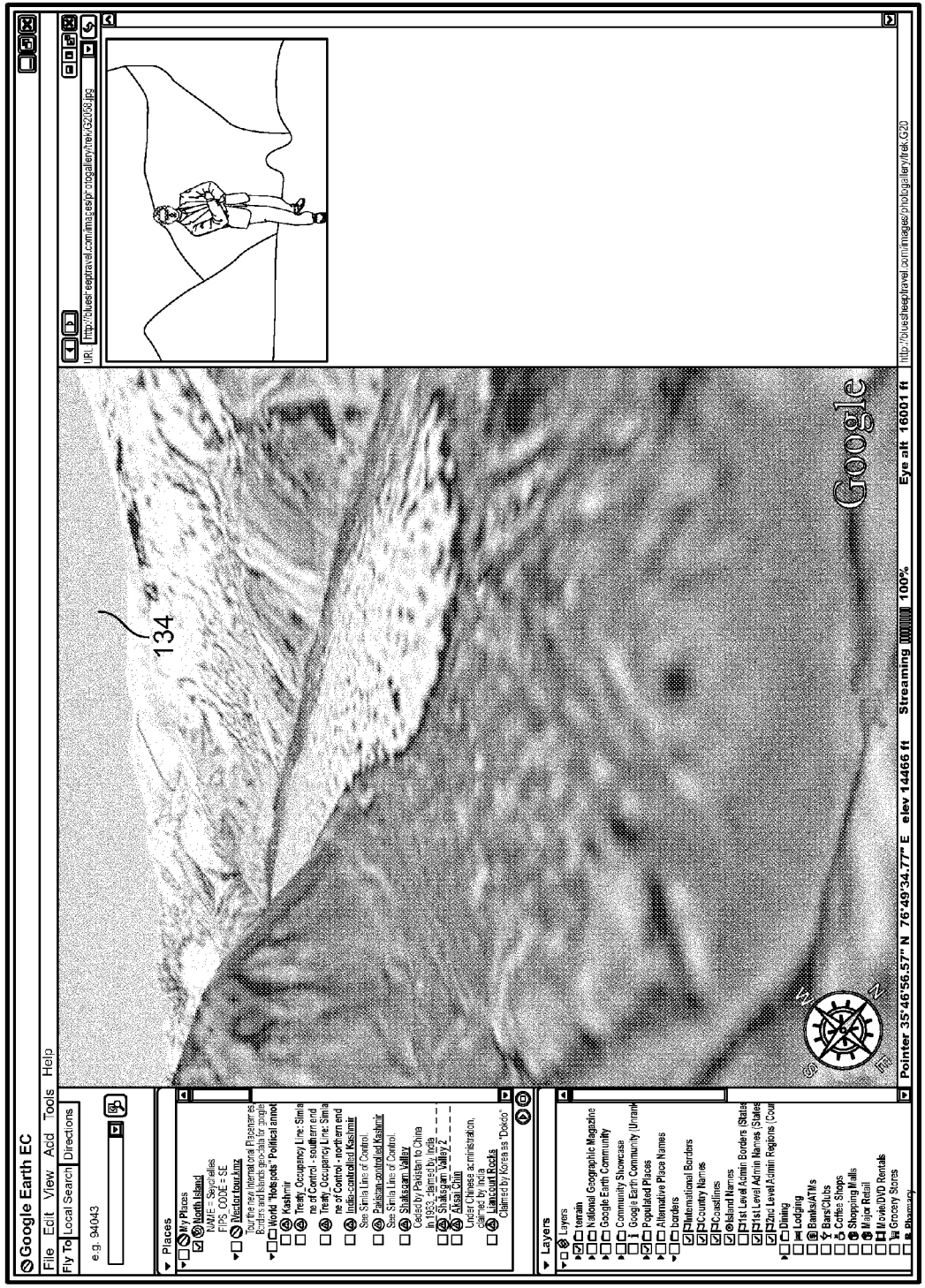
FIG. 10 is a screenshot of virtual globe imagery of Shaksgam Valley, displaying image search engine results including a digital photo of Shaksgam Valley that matches the virtual globe imagery.

In response to the click, a preconfigured search query is launched to the image search service using the string, "Shaksgam Valley", and the search results are returned (e.g. to the sidebar shown.) So it is not necessary for the user to enter any search text, merely to click the link. The search results are presented in the side panel under the search text box 132, and include a digital photo 134 of the Shaksgam Valley, show in FIG. 10.

Figure 11:
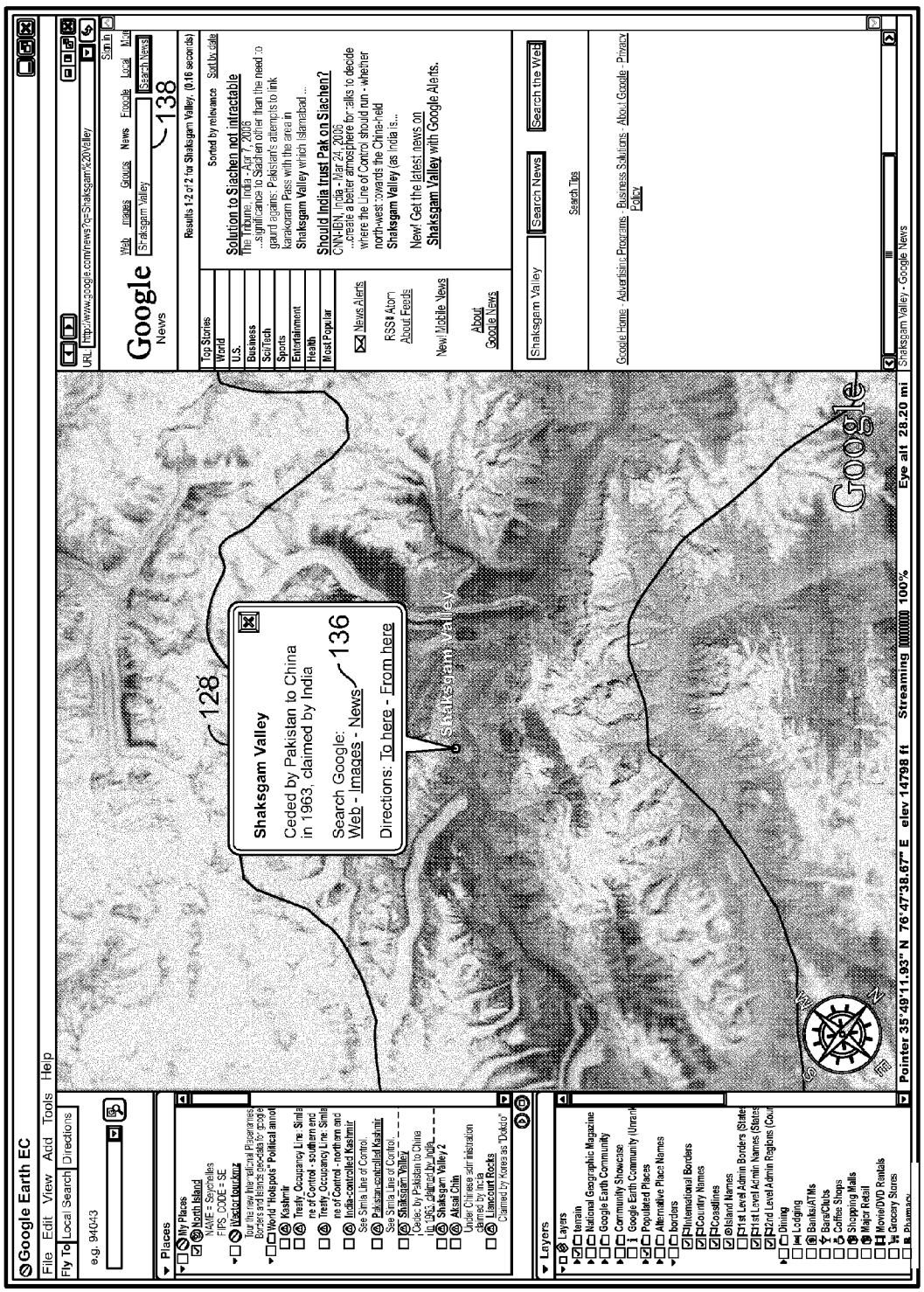
FIG. 11 is a screenshot of virtual globe imagery if Shaksgam Valley with a news source selected.

FIG. 11 is a screenshot of a user interface 100 displaying map imagery and a content access portal 128 including a link 136 for launching a news search service. The user clicks on the link 136, causing a text search box 138 to be displayed in a side panel of the user interface 100. In response to the click, a preconfigured search query is launched to the news search service using the string, "News", and the search results are returned (e.g. to the sidebar shown.) So it is not necessary for the user to enter any search text, merely to click the link. The search results are presented in the side panel under the search text box 138, and include links to news articles related to the Shaksgam Valley.

Figure 12:
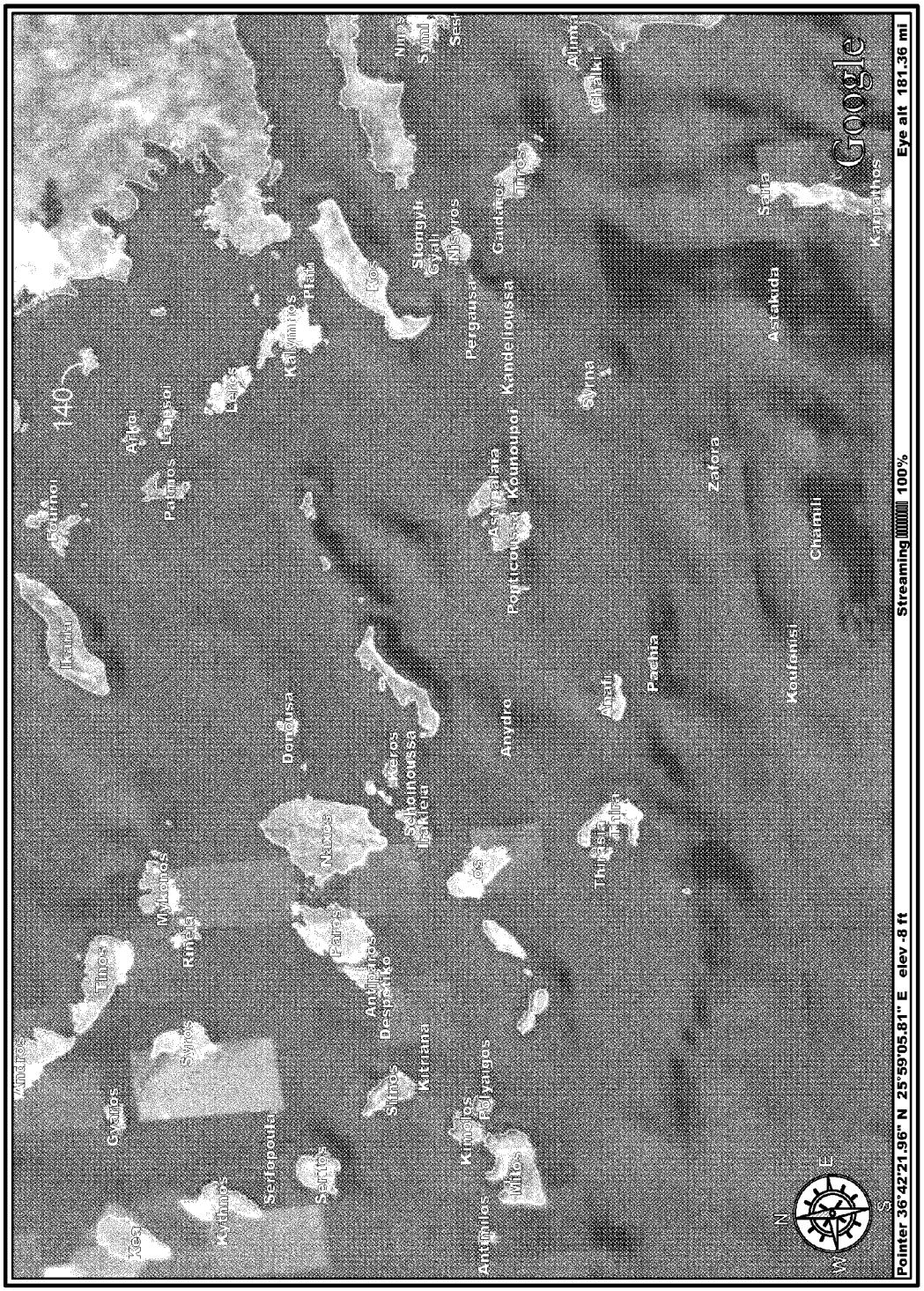
FIG. 12 is a screenshot of virtual globe imagery of the Greek Isles, zoomed out.
Figure 13:
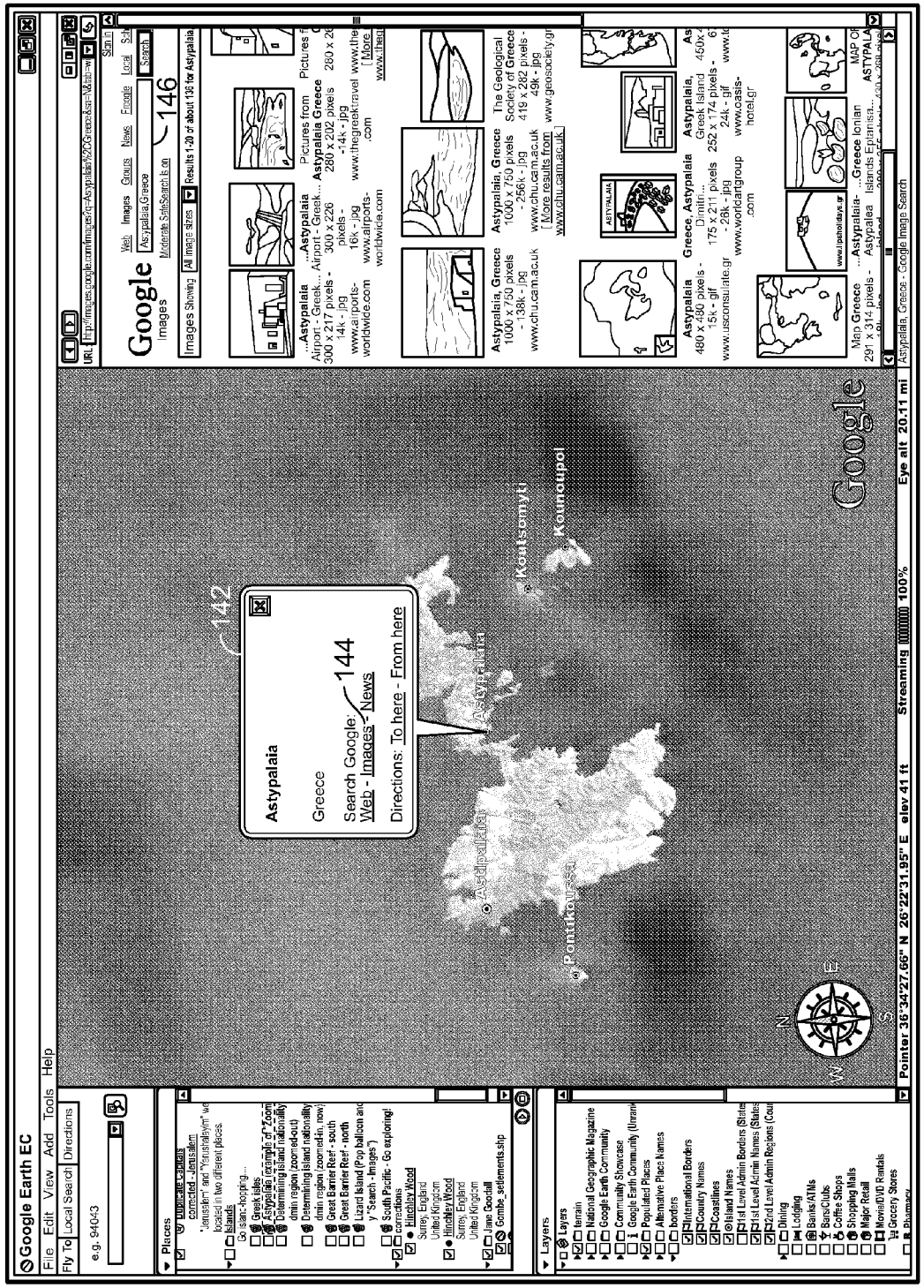
FIG. 13 is a screenshot of virtual globe imagery of the Greek Islands of Astypalaia, zoomed in, and an image search engine selected.

FIG. 12 is a screenshot of map imagery 140 of the Greek Isles, zoomed out. At this first zoom level, many feature labels are displayed for marking the various islands of the Greek Isles, resulting in a visually cluttered display. The user zooms in on Astypalaia, resulting in a content access portal 142 to be displayed in the user interface 100. As in the previous examples, the portal 142 includes links to Web, image and news services. In this example, the user clicked on a link 144 for launching an image search service. In response to the click, a preconfigured search query is launched to the image search service using the string, "Astypalaia, Greece", and the search results are returned (e.g. to the sidebar shown.) So it is not necessary for the user to enter any search text, merely to click the link. Referring to FIG. 13, the results of the search that match query are displayed in the side panel under the search text box 146, and include digital photos of Astypalaia.

In this "Greek Isle" example, the first zoom level was visually cluttered with many feature labels for the islands. When the user zoomed on Astypalaia to a second zoom level, a content access portal was presented for providing related content. Thus, at a first zoom level, the user received the benefit of many feature labels, and, at a second zoom level, the user received the benefit of easy and immediate access to related content without losing the "map-like" view.

Process Overview

Figure 14:
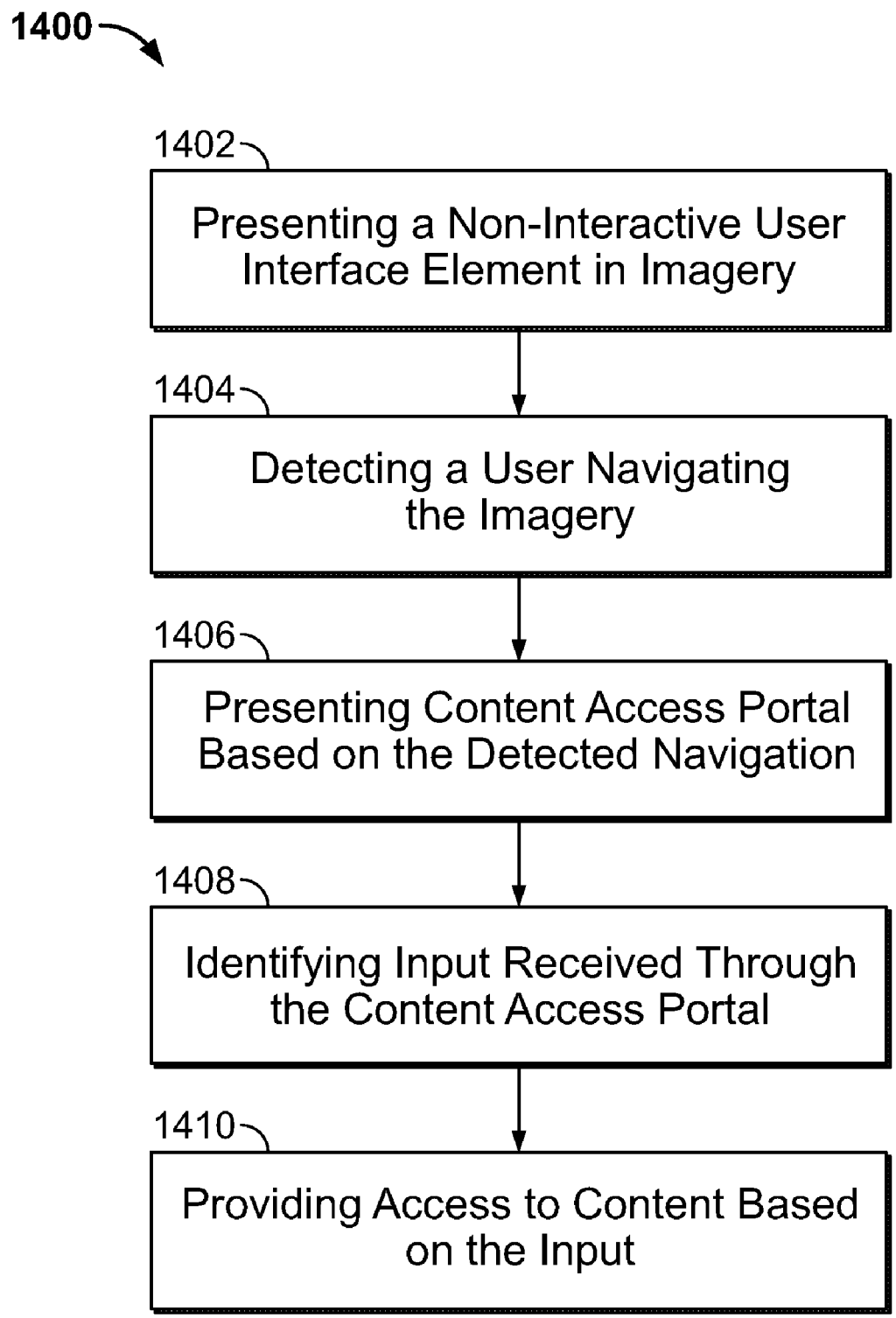
FIG. 14 is flow diagram showing an example of a process for generating an interactive user interface element in response to a trigger event.

FIG. 14 is flow diagram showing an example of a process 1400 for generating an interactive user interface element in response to a trigger event. In some implementations, the process 1400 begins by presenting a non-interactive user interface element in map imagery (1402). Next, a user navigation action (e.g., a zoom, hover, rotation) is detected (1404). A content access portal is presented based on the detected navigation action (1406). The content access portal can include links to various online resources. Input (e.g., user input) received through the portal is identified (1408). Access to content is provided by the portal in response to the input (1410).

Figure 15:
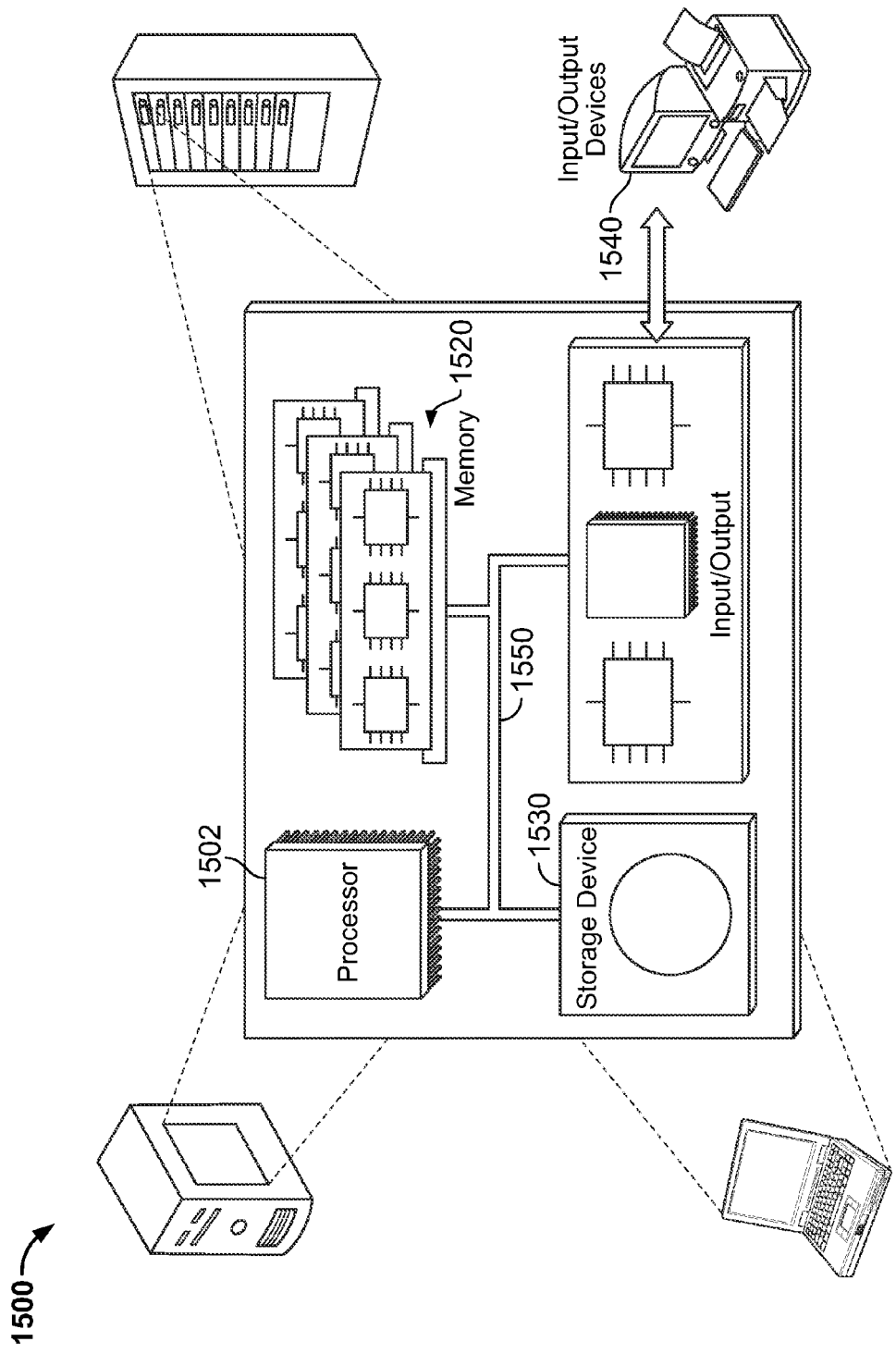
FIG. 15 is a block diagram showing an example of a system for hosting a virtual globe client program for performing operations described in reference to FIGS. 1-14.

FIG. 15 is a block diagram showing an example of a system 1500 for hosting a virtual globe client program for performing operations described in reference to FIGS. 1-14. The system 1500 can be used for practicing operations described in reference to FIGS. 1-14. The system 1500 can include a processor 1510, a memory 1520, a storage device 1530, and input/output devices 1540. Each of the components 1510, 1520, 1530, and 1540 are interconnected using a system bus 1550. The processor 1510 is capable of processing instructions for execution within the system 1500. Such executed instructions can implement one or more processes described in reference to FIGS. 1-14, for example. The processor 1510 can be single-threaded, multi-threaded, include multiple processing cores, etc. There can be multiple processor chips 1510 having one or more processing cores which run in, for example, a parallel processing configuration. The processor 1510 is capable of processing instructions stored in the memory 1520 or on the storage device 1530 to display graphical information for a user interface on the input/output device 1540.

The memory 1520 is a computer readable medium such as volatile or non-volatile memory that stores information within the system 1500. The memory 1520 could store files or data structures. The storage device 1530 is capable of providing persistent storage for the system 1500. The storage device 1530 may be a floppy disk device, a hard disk device, an optical disk device, or a tape device, or other suitable persistent storage means. The input/output device 1540 provides input/output operations for the system 1500. In one implementation, the input/output device 1540 includes a keyboard and/or pointing device. In another implementation, the input/output device 1540 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, which is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A method comprising:
    generating a non-interactive user interface element associated with a map feature for presentation with map imagery;
    presenting the non-interactive user interface element with map imagery;
    detecting a predetermined user action that indicates user interest in the map feature;
    responsive to detecting the predetermined user action indicating user interest in the map feature,
        generating an interactive user interface element associated with the map feature for presentation with map imagery, and
        replacing the non-interactive user interface element with the interactive user interface element;
    detecting a user interaction with the interactive user interface element; and
    responsive to detecting a user interaction with the interactive user interface element, providing access to content related to the map feature.

2. The method of claim 1, wherein replacing the non-interactive user interface element with the interactive user interface element further comprises:
    morphing the non-interactive user interface element into the interactive user interface element.

3. The method of claim 2, wherein the morphing is controlled based on the map feature type or significance of the map feature.

4. The method of claim 1, wherein replacing the non-interactive user interface element with the interactive user interface element is controlled based on the map feature type or significance of the map feature.

5. The method of claim 1, wherein providing access to related content further comprises:
    providing a link to one or more resources.

6. The method of claim 5, wherein at least one resource is a search service.

7. The method of claim 1, wherein providing access to related content further comprises:
    presenting a content access portal; and
    presenting content through the content access portal.

8. The method of claim 7, wherein the content access portal is a pop-up window.

9. The method of claim 1, wherein the interactive user interface element is a feature label with a clickable icon, and a user interacts with the feature label by clicking the icon.

10. The method of claim 1, wherein detecting the predetermined user action comprises detecting a zoom action.

11. The method of claim 1, wherein detecting the predetermined user action comprises detecting that a cursor is hovering over the feature.

12. The method of claim 1, wherein detecting the predetermined user action comprises detecting rotation of imagery over the feature.

13. A method comprising:
    generating a non-interactive feature label associated with a map feature for presentation with virtual globe imagery;
    presenting the non-interactive feature label on the virtual globe imagery;
    detecting user interest in the map feature based on an increased zoom level;
    responsive to detecting user interest in the map feature,
        generating an interactive feature label associated with the map feature for presentation with virtual globe imagery, and
        replacing the non-interactive feature label with the interactive feature label;
    identifying input requesting access to content related to the map feature; and
    providing access to content in response to the input.

14. The method of claim 13, wherein providing access to content further comprises:
    providing access to a search service.

15. The method of claim 14, wherein the search service is from a group of search services consisting of World Wide Web search, image search and news search.

16. A method comprising:
    presenting a non-interactive user interface element relating to a feature in map imagery;
    detecting a predetermined user action that indicates user interest in the feature;
    responsive to detecting the predetermined user action indicating user interest in the feature,
        generating an interactive user interface element relating to the feature in map imagery, and
        replacing the non-interactive user interface element with the interactive user interface element;
    detecting a user action relating to the interactive user interface element;
    responsive to detecting the user action relating to the interactive user interface element, presenting a content access portal relating to the feature;

identifying input received through the content access portal; and providing access to related content based on the input.

17. A system comprising:
a processor;
a computer-readable medium coupled to the processor and including instructions, which, when executed by the processor, causes the processor to perform operations comprising:
generating a non-interactive user interface element associated with a map feature for presentation with map imagery;
presenting the non-interactive user interface element with map imagery;
detecting a predetermined user action that indicates user interest in the map feature;
responsive to detecting the predetermined user action indicating interest in the map feature,
generating an interactive user interface element associated with the map feature for presentation with map imagery, and
replacing the non-interactive user interface element with the interactive user interface element;
detecting user interaction with the interactive user interface element; and
providing access to related content in response to the detection.

18. A system comprising:
a processor;
a computer-readable medium coupled to the processor and including instructions, which, when executed by the processor, causes the processor to perform operations comprising:
generating a non-interactive feature label associated with a map feature for presentation with virtual globe imagery;
presenting the non-interactive feature label on the virtual globe imagery;
detecting user interest in the map feature based on an increased zoom level;
responsive to detecting user interest in the map feature,
generating an interactive feature label associated with the map feature for presentation with virtual globe imagery, and
replacing the non-interactive feature label with the interactive feature label;
identifying input requesting access to content related to the map feature; and
providing access to content in response to the input.

19. A system comprising:
a processor;
a computer-readable medium coupled to the processor and including instructions, which, when executed by the processor, causes the processor to perform operations comprising:
presenting a non-interactive user interface element relating to a feature in map imagery;
detecting a predetermined user action that indicates user interest in the feature;
responsive to detecting the predetermined user action indicating interest in the feature,
generating an interactive user interface element relating to the feature in map imagery, and
replacing the non-interactive user interface element with the interactive user interface element;
detecting a user action relating to the interactive user interface element;
responsive to detecting the user action relating to the interactive user interface element, presenting a content access portal relating to the feature;
identifying input received through the content access portal; and
providing access to related content based on the input.

20. A computer-readable non-transitory storage medium having instructions stored thereon, which, when executed by the processor, causes the processor to perform operations comprising:
generating a non-interactive feature label associated with a map feature for presentation with virtual globe imagery;
presenting the non-interactive feature label on the virtual globe imagery;
detecting user interest in the map feature based on an increased zoom level;
responsive to detecting user interest in the map feature,
generating an interactive feature label associated with the map feature for presentation with virtual globe imagery, and
replacing the non-interactive feature label with the interactive feature label;
identifying input requesting access to content related to the map feature; and
providing access to content in response to the input.

21. A computer-readable non-transitory storage medium having instructions stored thereon, which, when executed by the processor, causes the processor to perform operations comprising:
presenting a non-interactive user interface element relating to a feature in map imagery;
detecting a predetermined user action that indicates user interest in the feature;
responsive to detecting the predetermined user action indicating user interest in the feature,
generating an interactive user interface element relating to the feature in map imagery, and
replacing the non-interactive user interface element with the interactive user interface element;
detecting a user action relating to the interactive user interface element;
responsive to detecting the user action relating to the interactive user interface element, presenting a content access portal relating to the feature;
identifying input received through the content access portal; and
providing access to related content based on the input.

22. A computer-readable non-transitory storage medium having instructions stored thereon, which, when executed by the processor, causes the processor to perform operations comprising:
generating a non-interactive user interface element associated with a map feature for presentation with map imagery;
presenting the non-interactive user interface element with map imagery;
detecting a predetermined user action that indicates user interest in the map feature;
responsive to detecting the predetermined user action indicating user interest in the map feature,
generating an interactive user interface element associated with the map feature for presentation with map imagery, and
replacing the non-interactive user interface element with the interactive user interface element;
detecting user interaction with the interactive user interface element; and providing access to related content in response to the detection.

23. A system comprising:

means for generating a non-interactive user interface element associated with a map feature for presentation with map imagery;

means for presenting the non-interactive user interface element with map imagery;

means for detecting a predetermined user action that indicates user interest in the map feature;

means for, responsive to detecting the predetermined user action indicating user interest in the map feature, generating an interactive user interface element associated with the map feature for presentation with map imagery, and replacing the non-interactive user interface element with the interactive user interface element;

means for detecting user interaction with the interactive user interface element; and means for providing access to related content in response to the detection.

* * * * *

UNITED STATES PATENT AND TRADEMARK OFFICE
CERTIFICATE OF CORRECTION

| | | |
|---|---|---|
| PATENT NO. | : 8,368,722 B1 | Page 1 of 1 |
| APPLICATION NO. | : 11/737102 | |
| DATED | : February 5, 2013 | |
| INVENTOR(S) | : Moore | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this
Second Day of December, 2014

Michelle K. Lee
*Deputy Director of the United States Patent and Trademark Office*